United States Patent
Sugino et al.

(10) Patent No.: US 7,567,446 B2
(45) Date of Patent: Jul. 28, 2009

(54) POWER CONVERSION APPARATUS INCLUDING A RECTIFIER CIRCUIT AND AN INVERTER CIRCUIT

(75) Inventors: Hidenori Sugino, Sakura (JP); Naoki Takata, Narashino (JP)

(73) Assignee: Hitachi Industrial Equipment System Co., Ltd., Tokyo (JP)

( * ) Notice: Subject to any disclaimer, the term of this patent is extended or adjusted under 35 U.S.C. 154(b) by 230 days.

(21) Appl. No.: 11/637,092

(22) Filed: Dec. 12, 2006

(65) Prior Publication Data

US 2007/0189046 A1    Aug. 16, 2007

(30) Foreign Application Priority Data

Feb. 13, 2006 (JP) .............................. 2006-034660

(51) Int. Cl.
*H02M 5/458* (2006.01)
*H02M 5/45* (2006.01)

(52) U.S. Cl. ............................. 363/37; 363/34; 363/39

(58) Field of Classification Search .................. 363/37, 363/34, 39
See application file for complete search history.

(56) References Cited

U.S. PATENT DOCUMENTS

| | | | | | |
|---|---|---|---|---|---|
| 3,863,140 | A | * | 1/1975 | Easter et al. | 323/288 |
| 5,515,261 | A | * | 5/1996 | Bogdan | 363/89 |
| 5,568,041 | A | * | 10/1996 | Hesterman | 323/207 |
| 5,752,838 | A |   | 5/1998 | Nishizawa | |
| 2005/0270745 | A1 | * | 12/2005 | Chen et al. | 361/707 |
| 2005/0270806 | A1 | * | 12/2005 | Zhu | 363/17 |

FOREIGN PATENT DOCUMENTS

DE    196 18 736    11/1996
JP    8-308250    11/1996

* cited by examiner

*Primary Examiner*—Bao Q Vu
(74) *Attorney, Agent, or Firm*—Antonelli, Terry, Stout & Kraus, LLP.

(57) ABSTRACT

A power conversion apparatus is disclosed. In the case where a coil is arranged in a power module, the circuit system between the ends of the coil in the power module, regardless of where the coil is located, is structurally isolated and insulated from each other. This isolation and insulation prevents the capacitance from being created across the coil, and the coil can exhibits the effect as a filter, thereby improving the characteristics of a noise filter.

19 Claims, 9 Drawing Sheets

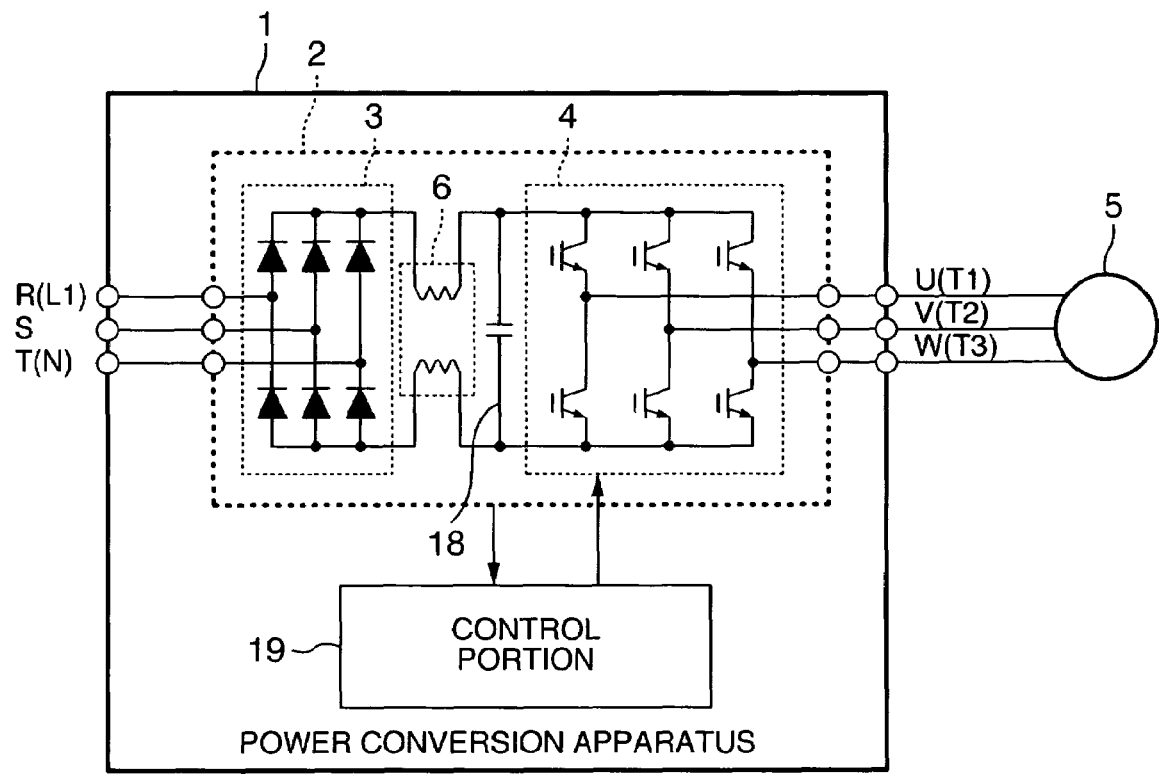
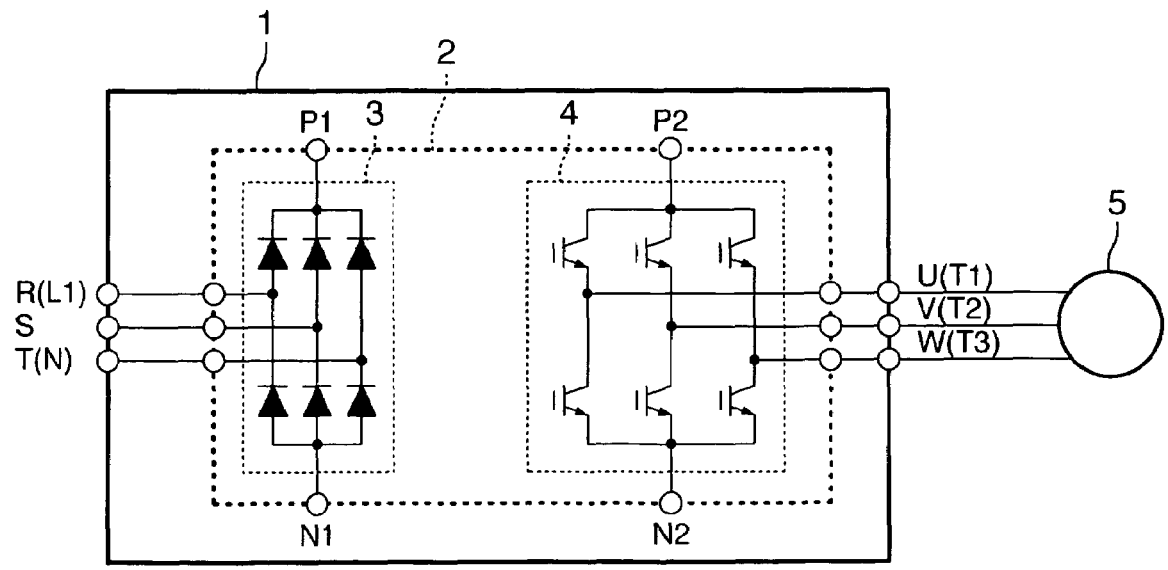

NOISE TERMINAL VOLTAGE MEASUREMENT

DEVICE NAME : 037HF
INPUT POWER : 3Phase 400V 50Hz
TEMPERATURE : 18degree C
HUMIDITY : 62%RH
ATMOSPHERIC PRESSURE : 916hPa
MEASURING INSTRUMENT : R3361A,ESCS30

L1(PEAK) ——
L1(QP) ○
L1(Ave.) ◉

| FREQUENCY [MHz] | LEVEL (QP) [dBuV] | LEVEL (AVE.) [dBuV] |
|---|---|---|
| 0.15 | 74.8 | 67.4 |
| 0.5489 | 77.8 | 69.5 |

FIG.10A
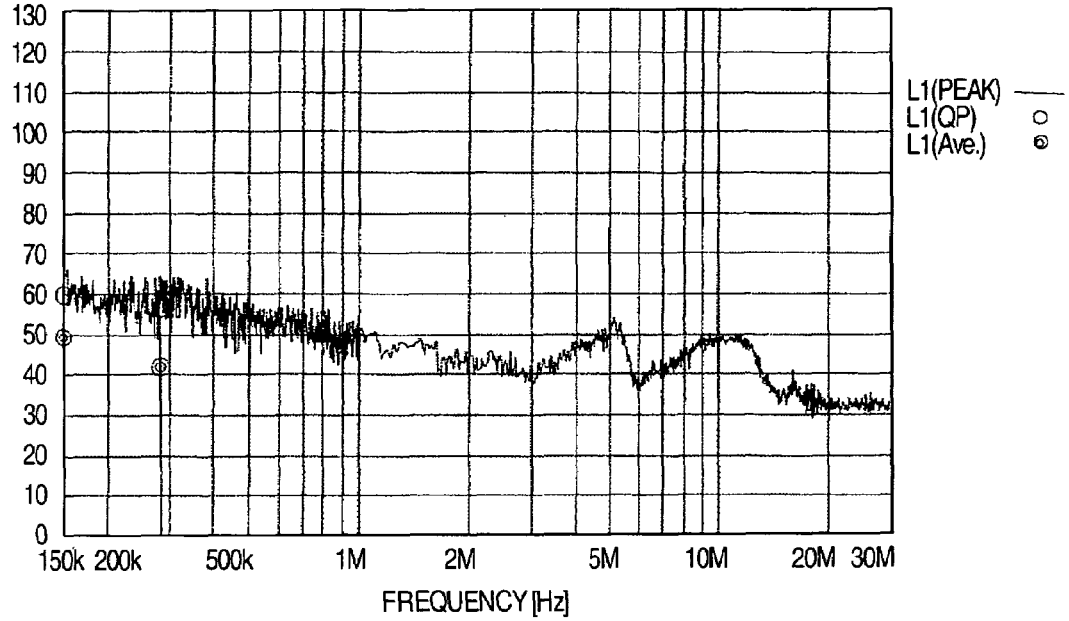
FIG.10B
| FREQUENCY [MHz] | LEVEL (QP) [dBuV] | LEVEL (AVE.) [dBuV] |
|---|---|---|
| 0.15 | 59.9 | 49.3 |
| 0.2842 | 56.4 | 41.8 |
FIG.11
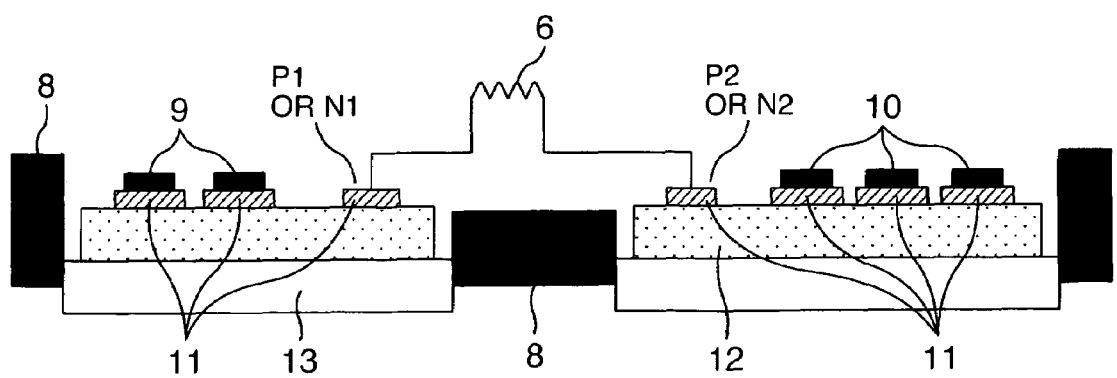

PORTION A   PORTION B

PORTION A   PORTION B

POWER CONVERSION APPARATUS INCLUDING A RECTIFIER CIRCUIT AND AN INVERTER CIRCUIT

INCORPORATION BY REFERENCE

The present application claims priority from Japanese application JP2006-034660 filed on Feb. 13, 2006, the content of which is hereby incorporated by reference into this application.

BACKGROUND OF THE INVENTION

This invention relates a technique for providing a power conversion apparatus.

In the power conversion apparatus such as an AC motor driven with variable speeds, electric and magnetic noises (hereinafter referred to as the "electro-magnetic interference" (EMi)) are known to be generated by the operation thereof.

In the related art, a filter called the noise filter is known to be mounted as an electric circuit element for reducing the EMi as described in JP-A-08-308250 (pp. 5-6, and FIG. 1, for example), corresponding to U.S. Pat. No. 5,752,838 and DE19618736).

SUMMARY OF THE INVENTION

In some recent cases, the rectifier portion and the inverter portion of a small-capacity inverter apparatus has been mounted on the same metal substrate within a single power module as a structure (hereinafter referred to as the module) for supporting the rectifier portion and the inverter portion integrally.

The metal substrate is a collective name of the base substrate of aluminum, the insulating layer thereon and the circuit pattern arranged thereon.

In this case, a capacitive coupling may be generated through metal plates including a substrate, an underlying aluminum base (hereinafter referred to as the aluminum base) and a conductor between the ends (input and output units) of the coil arranged in the power module as a circuit element to reduce EMi. Due to the effect of this capacitance, the problem of a reduced effect of the filter may be posed even in the case where the coil is arranged.

In order to solve this problem, it is an object of this invention to provide a power conversion apparatus wherein the deterioration of the noise reducing effect is prevented as far as possible in the case where the coil is arranged in the power module having the rectifier portion and the inverter portion.

Another object of the invention is to solve the aforementioned problem by providing a power conversion apparatus having a structure with a reduced capacitance generated by capacitive coupling, etc.

The insulating layer and the aluminum base of the power module where the capacitance is generated are divided into two electrically isolated parts including a semiconductor chip making up the rectifier portion and a semiconductor chip making up the inverter portion.

The cut section of division is covered with plastic to maintain insulation. As an alternative, an insulating material may be coated on the plastic formed up to about the height of the insulating layer.

According to this invention, there is provided a power conversion apparatus having a higher reliability than in the prior art.

Other objects, features and advantages of the invention will become apparent from the following description of the embodiments of the invention taken in conjunction with the accompanying drawings.

BRIEF DESCRIPTION OF THE DRAWINGS

FIG. 1 is a diagram showing a configuration of the power conversion apparatus according to an embodiment of the invention.

FIG. 2 is a diagram for explaining the power module.

FIGS. 10A and 10B show the result of a noise test conducted by a method according to the invention.

FIG. 11 is a diagram for explaining a case in which a coil is arranged in the power module.

DETAILED DESCRIPTION OF THE INVENTION

Figure 3:
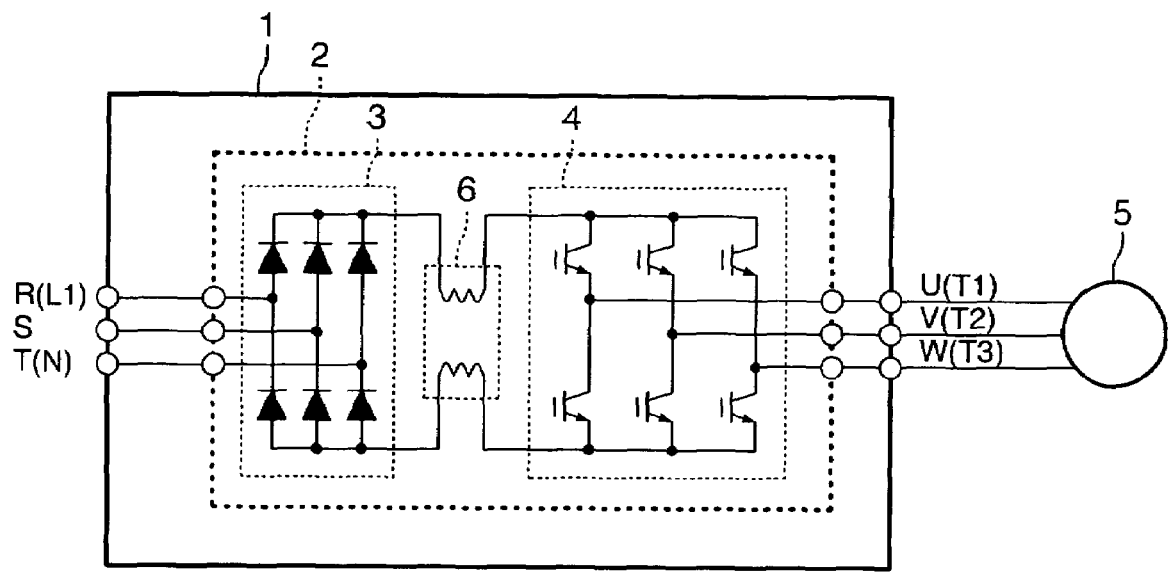
FIG. 3 is a diagram for explaining another embodiment.

Embodiments of the invention are explained below sequentially with reference to the accompanying drawings.

In the drawings, reference characters R(L1), S, T(N) designate a three- or single-phase AC power input, and U(T1), V(T2), W(T3) a three-phase AC output.

FIG. 1 is a diagram for explaining an embodiment. In the configuration shown in FIG. 1, a power conversion apparatus 1 and an induction motor 5 driven are connected to each other.

In FIG. 1, the three- or single-phase AC power is input from the commercial power supply through the terminals R(L1), S, T(N) of the power conversion apparatus 1, and converted into the DC power by a rectifier portion 3. The output of the rectifier portion 3, after being smoothed by a smoothing portion 18, is input to an inverter portion 4. In the inverter portion 4, the power from the smoothing portion 18 is converted into the AC power again and supplied to an induction motor 5 through the terminals U(T1), V(T2), (T3).

In the process, the inverter portion 4 is controlled by a control portion 19 according to the pulse width modulation scheme. In FIG. 1, the control portion 19, receiving a current signal from the power module 2, etc., performs the arithmetic operation and outputs the PWM control signal, etc. to the inverter portion 4 thereby to carry out the control operation.

Also, the rectifier portion 3 and the inverter portion 4 are arranged within the power module 2.

In the embodiment shown in FIG. 1, a coil 6 providing a component part of a noise filter to prevent the EMi is connected to the output of the rectifier portion 3, and the output of the coil 6 is connected to the smoothing portion 18.

FIG. 2 is a diagram for explaining the configuration of the power module 2.

The power module 2 having mounted thereon a power semiconductor element for driving the induction motor 5 is built in the power conversion apparatus 1. The power module 2 contains therein at least the rectifier portion 3 for rectifying the three- or single-phase power input and the inverter portion 4 for converting the rectified power into the AC power again and supplying the induction motor 5.

As shown in FIG. 1, the coil 6 providing a component part of the noise filter aimed at prevention of EMi, if connected to the power conversion apparatus, is normally inserted between the power input unit and the rectifier portion 3, between the rectifier portion 3 and the inverter portion 4 or between the inverter portion 4 and the output unit of the induction motor 5. Taking this connection into consideration, the parts described above are isolated electrically from each other in the power module.

FIG. 2 shows an example of the rectifier portion 3 and the inverter portion 4 isolated from each other in the case where the coil is arranged between the rectifier portion 3 and the inverter portion 4, in which case the output of the rectifier portion 3 is designated as P1, N1 and the input to the inverter portion 4 as P2, N2.

A lead pin is arranged taking into consideration the fact that the substrate mounted on the power module 2 is soldered or in view of the fact that in the case where the filter part such as the coil 6 is mounted in the power module, the mounting pad is arranged. Therefore, the shape of the input and output P1, N1, P2, N2 is determined case by case.

In the case where the coil explained in the embodiment is arranged as a circuit part in the power module, the noise filter effect is improved by employing an appropriate internal structure of the power module regardless of whether the actual position of the coil is inside or outside of the power module.

FIG. 3 shows an example of a circuit with the coil 6 inserted between the rectifier portion 3 and the inverter portion 4.

Figure 4:
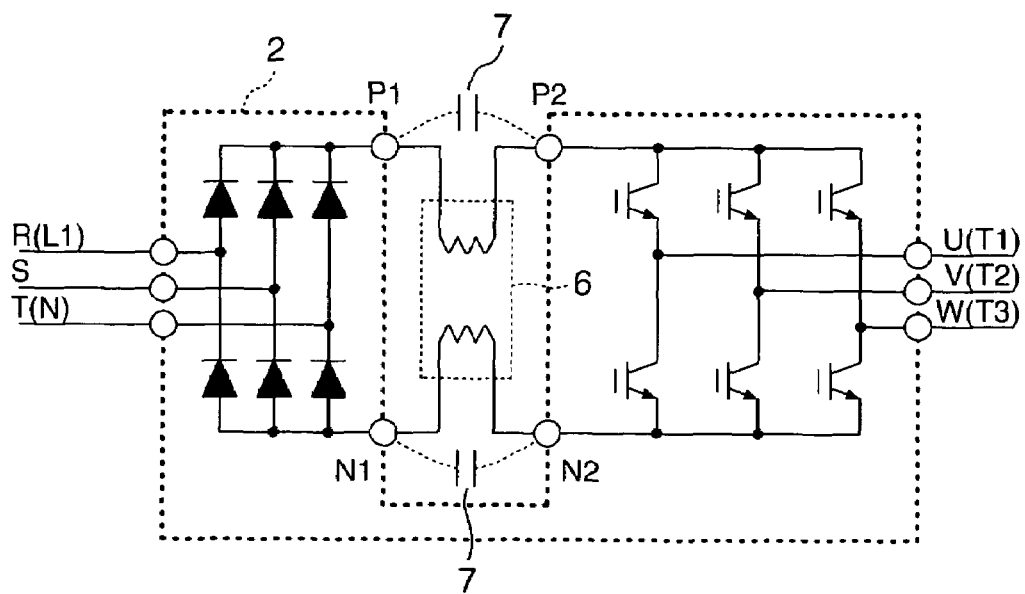
FIG. 4 is a diagram for explaining still another embodiment.

FIG. 4 shows an example of a case in which the coil 6 is mounted on a separate substrate connected by soldering to the power module 2 in actual mounting work. The explanation below refers to this case, in which the power conversion apparatus is called the inverter apparatus.

In the conventional power module, the capacitance 7 is generated by coupling between the ends of the coil 6, resulting in a worse effect as a filter.

Figure 5:
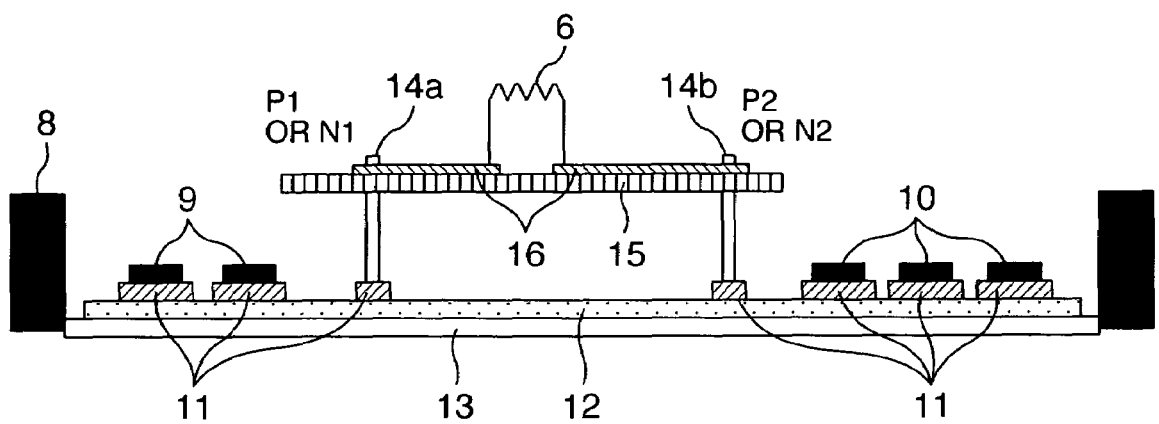
FIG. 5 is a diagram for explaining yet another embodiment.

FIG. 5 shows an example of the sectional structure of an ordinary power module according to the prior art. In FIG. 5, the coil 6 is designated by a circuit symbol. FIG. 5 represents, as in FIG. 3, a case in which the coil 6 is arranged between the rectifier portion 3 and the inverter portion 4 in the power module 2.

The power module 2 is covered by a plastic mold 8 or the like and contains therein semiconductor chips 9 making up the rectifier portion 3 and semiconductor chips 10 making up the inverter portion 4. The semiconductor chips 9, 10 are mounted by soldering on copper foils 11 constituting the circuit.

An insulating layer 12 is formed under the copper foils 11. An aluminum base 13 is formed under the insulating layer 12 and fixed by the plastic mold 8 as a body case. Actually, though not shown, a heat spreader may be further arranged.

The coil 6 is mounted on the substrate 15 by leads 14a, 14b from the power module 2. The lead 14a corresponds to the P1 or N1 portion, and the lead 14b corresponds to the P2 or N2 portion shown in FIG. 2 or 4. Specifically, the coil 6 is arranged, though physically outside the power module 2, inside the power module as a circuit element.

In the process, it is desirable that no capacitance is generated across the coil 6 in order to increase the filter effect. Specifically, it is desired to secure the electrical insulation positively between the P1 and P2 portions and between the N1 and N2 portions. This structure, however, generates the capacitance 7 between the lead 14a and the lead 14b through the copper foils 11, the insulating layer 12 and the aluminum base 13 making up a conductor.

Figure 6:
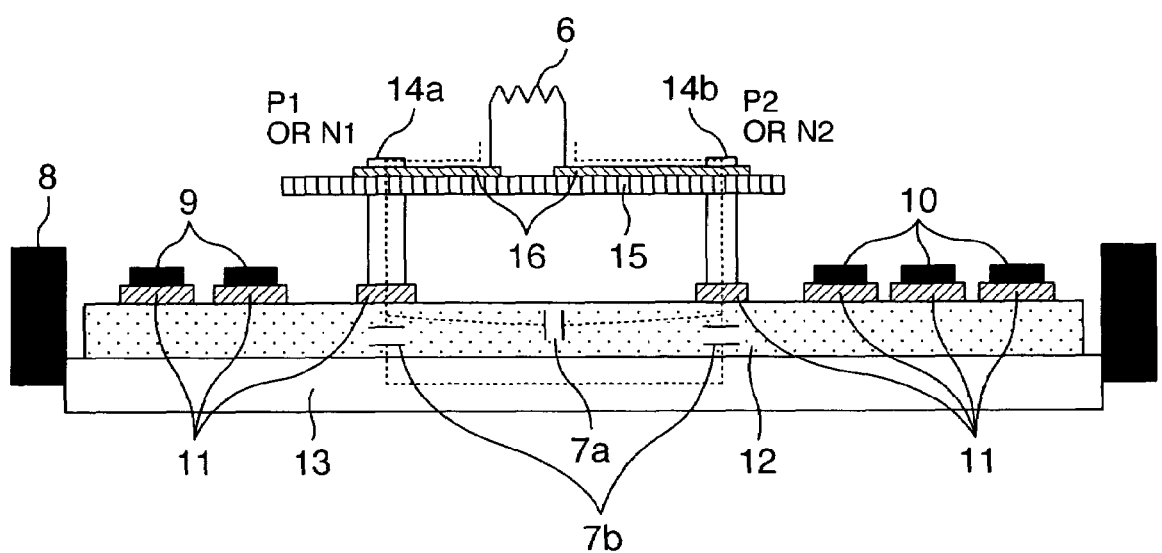
FIG. 6 is a diagram for explaining a further embodiment.
Figure 7:
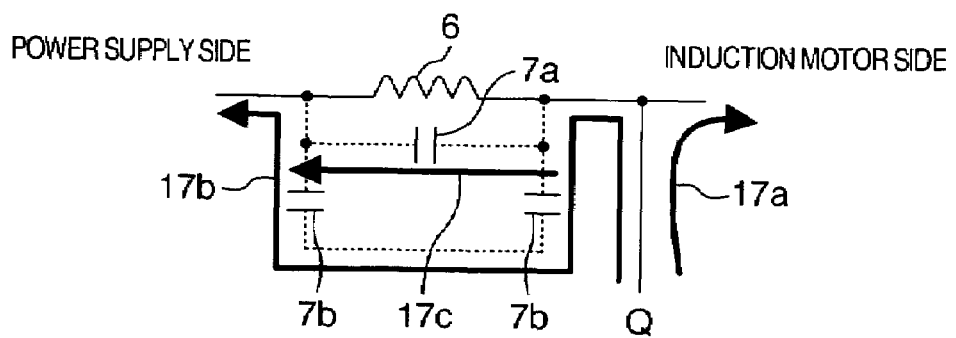
FIG. 7 is a diagram showing an equivalent circuit of FIG. 6.

Also, in the case where the P1 copper foil and the P2 copper foil in the power module are arranged in proximity to each other, the capacitance is generated even in the presence of the copper foils and the insulating layer 12 as an intermediary. FIG. 6 shows the route and place of capacitance generation with the insulating layer 12 and the aluminum base 13 in enlarged form. The capacitance 7 is generated in an equivalent circuit as shown in FIG. 7.

The reason why the filter effect is deteriorated by the generation of the capacitance 7 is explained with reference to FIG. 7. Once the induction motor is driven by the inverter, the high-frequency switching noises are generated by the inverter portion 4. The switching noises provisionally flow into the ground through the grounding capacitance of the noise filter arranged separately, and then return to the point Q in FIG. 7. At the same time, all the noise components ideally return to the inverter portion (induction motor) through the route 17a. Then, the noise flow toward the power supply would be suppressed thereby to reduce the noise level.

As described above, however, upon generation of the capacitance 7 across the coil, the noises which normally should be suppressed by the coil undesirably flow toward the power supply through the route 17b or 17c by way of the capacitance low in impedance, resulting in a lower noise reduction effect.

An embodiment of this invention realizes a configuration of an inverter apparatus in which the noise reduction effect is not deteriorated in the case where the coil is arranged as a circuit component in a single power module having both the rectifier portion and the inverter portion.

Figure 8:
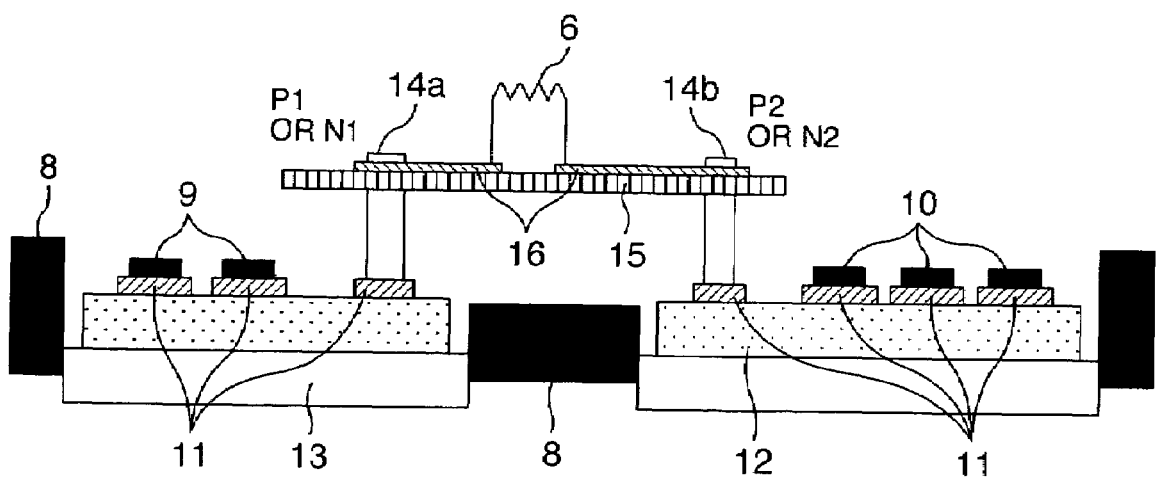
FIG. 8 is a diagram for explaining the structure of the power module according to the invention.

The problem described above is solved by a structure for reducing the capacitance 7 thus generated. FIG. 8 shows a structure for minimizing the capacitance 7 generated. This example also represents a case in which the coil is arranged between the rectifier portion and the inverter portion.

The insulating layer 12 and the aluminum base 13 where the capacitance 7 is generated are isolated from each other into the semiconductor chip 9 side making up the rectifier portion and the semiconductor chip 10 side making up the inverter portion. In other words, the insulating layer 12 and the aluminum base 13 conventionally integrated with each other are separated from each other.

Although aluminum is taken up by way of explanation above, a metal plate or a conductor high in heat conductivity may alternatively be used to release outside, by heat conduction, the heat generated in the rectifier portion and the inverter portion. Copper, silver or gold, for example, may be used instead of aluminum.

The section by which the insulating layer 12 and the aluminum base 13 are separated from each other is covered with a plastic mold 8 to secure insulation. As an alternative, the plastic mold is covered up to about the height of the insulating layer and coated with an insulating material.

As shown in FIG. 8, a test has been conducted to make sure that EMi is reduced after division of the power module and the divisive effect has been confirmed.

Figures 9A, 9B:
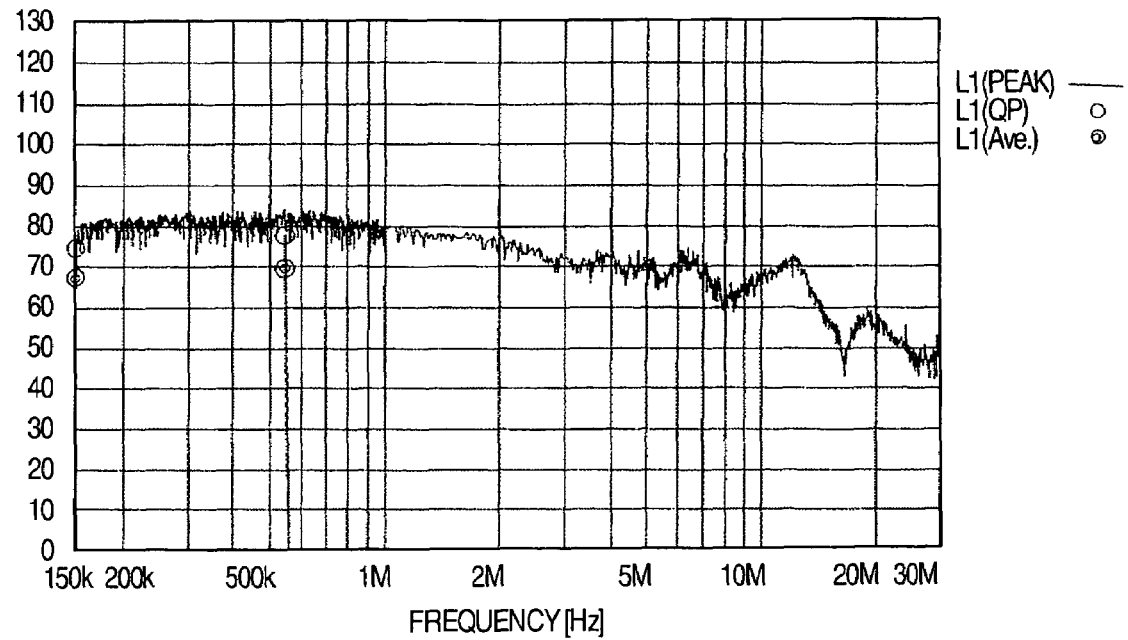
FIGS. 9A and 9B show the result of a noise test conducted according to the prior art.

FIGS. 9A, 9B show the result of measuring the noise level before dividing the power module. FIGS. 10A, 10B, on the other hand, show the result of measuring the noise level after dividing the power module. The noise terminal voltage has been measured in accordance with European Norm EN61800-3 on an inverter apparatus of 400 V class, 3.7 kW in output, with a general-purpose three-phase induction motor of 3.7 kW, 400 V class.

As shown in FIG. 8, by dividing the power module interior completely, the EMi level improvement of 15 dB or more in terms of quasi-peak (QP) value has been confirmed.

This embodiment represents a case in which the coil for the filter is mounted on the substrate outside the power module. In view of the fact that the coil generates heat, however, a high cooling effect is obtained by arranging the coil in the power module and radiating the heat from the heat sink in contact with the power module. This indicates that this embodiment is effective also in the case where the coil is arranged in the power module, as explained below with reference to FIG. 11.

FIG. 11 is a case in which the filter coil is mounted directly on the metal substrate in the power module instead of erecting the pins 14a, 14b to mount an external substrate in FIG. 8. Also in this case, the power module is separated, and therefore the effect of the coil is not deteriorated as the capacitance 7 is not generated across the coil as in the aforementioned case.

Figure 12:
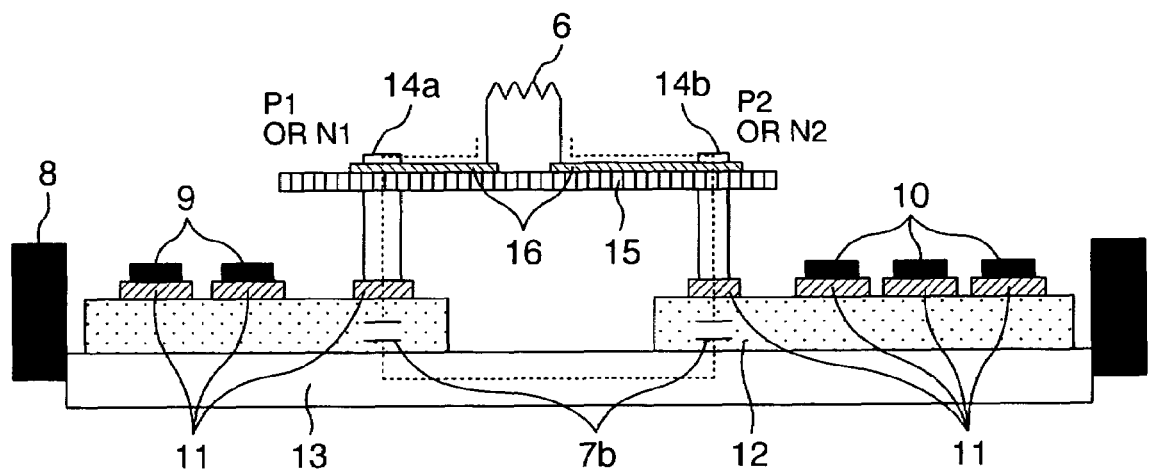
FIG. 12 is a diagram for explaining the structure of the power module according to another embodiment.

As another embodiment, as shown in FIG. 12, only the insulating layer 12 may be electrically isolated in the power module 2. By eliminating the capacitance 7a in FIGS. 6, 7, therefore, the total capacitance value can be reduced. Although the effect of the filter is reduced as compared with the case of complete separation shown in FIG. 8, the effect is greater than in the presence of the insulating layer. This configuration is effective in the case where the separation of the aluminum base poses the problem of the mounting flatness of the power module.

Apart from the aforementioned cases in which the coil is arranged between the rectifier portion and the inverter portion as a circuit element, a similar effect can be obtained by arranging the coil between the power input unit and the rectifier portion or between the inverter portion and the output unit of the induction motor. In other words, a power module structure is effective as long as the circuit portions at the ends of the coil are isolated and insulated from each other.

Figure 13:
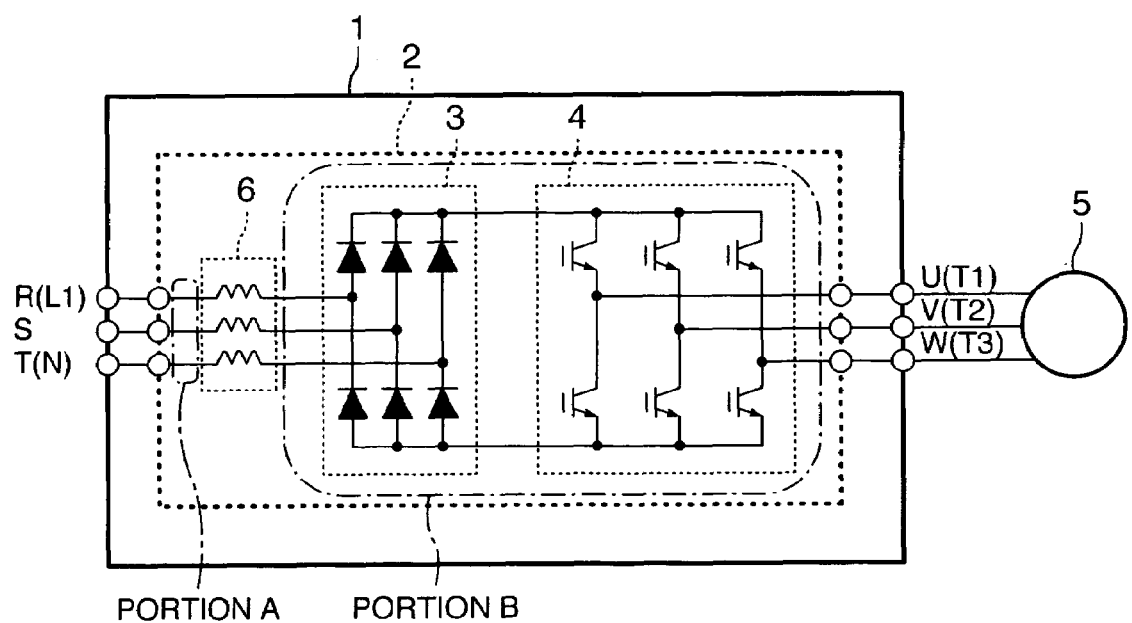
FIG. 13 is a diagram for explaining the insulation in the case where a coil is arranged between the power input unit and the rectifier portion.
Figure 14:
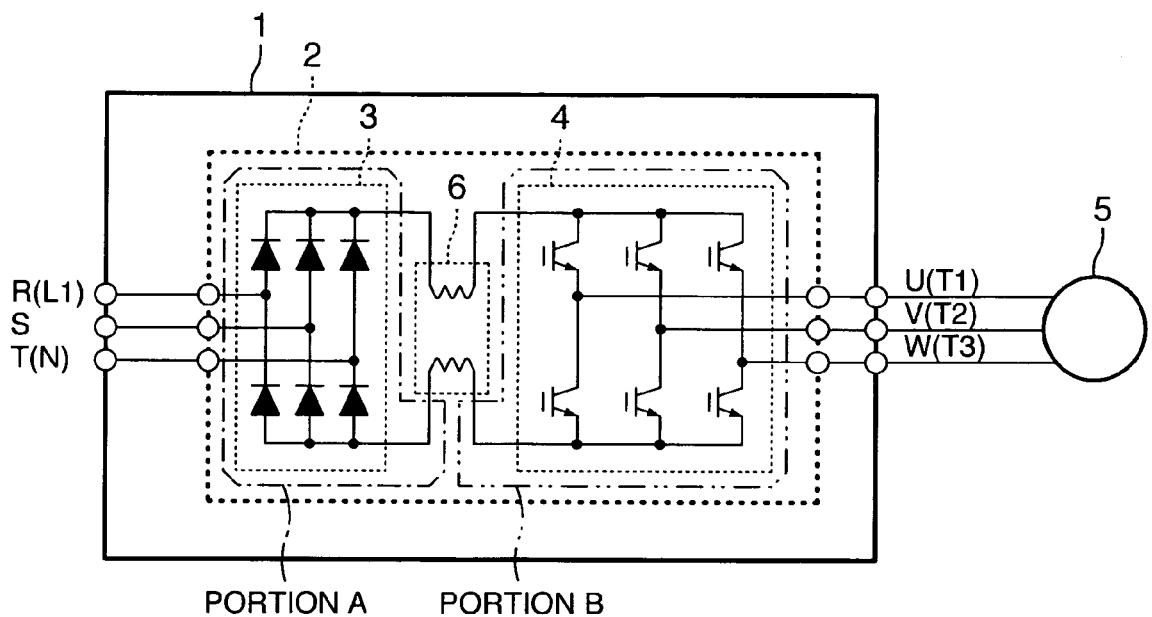
FIG. 14 is a diagram for explaining the insulation in the case where a coil is arranged between the rectifier portion and the inverter portion.
Figure 15:
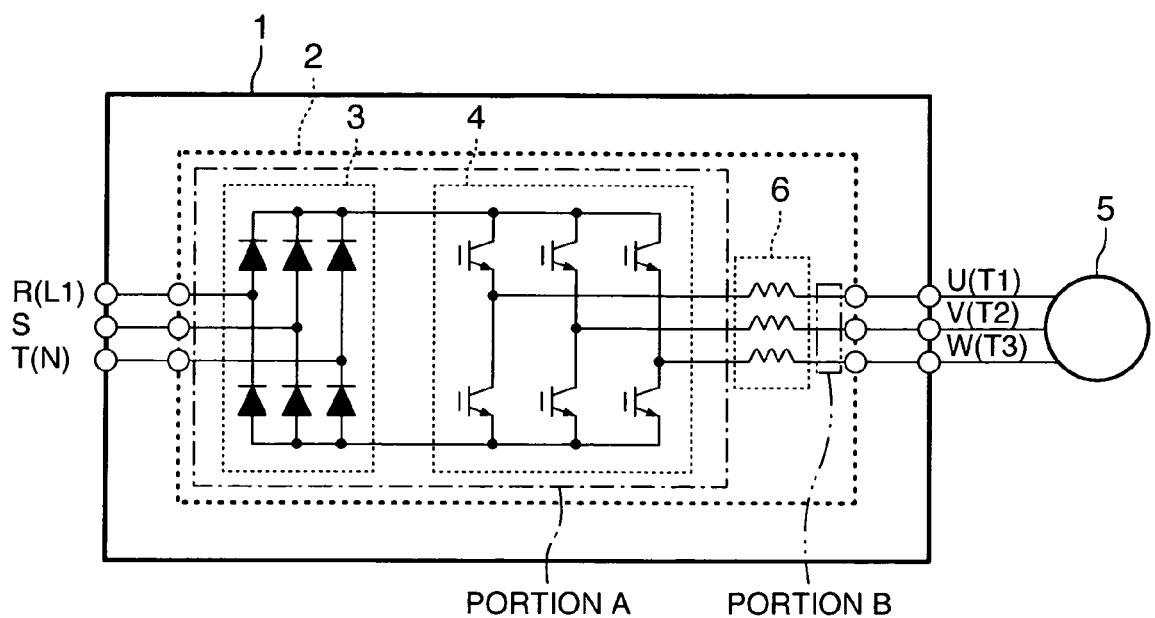
FIG. 15 is a diagram for explaining the insulation in the case where a coil is arranged between the inverter portion and the output unit of an induction motor.

FIG. 13 shows a case in which the coil 6 is inserted between the power input unit and the rectifier portion, FIG. 14 a case in which the coil 6 is arranged between the rectifier portion and the inverter portion, and FIG. 15 a case in which the coil 6 is arranged between the inverter portion and the output unit of the induction motor. In all of these cases, the effect of the coil as a filter can be improved by employing the aforementioned isolating/insulating structure between the portions A and B in the drawings.

Figure 16:
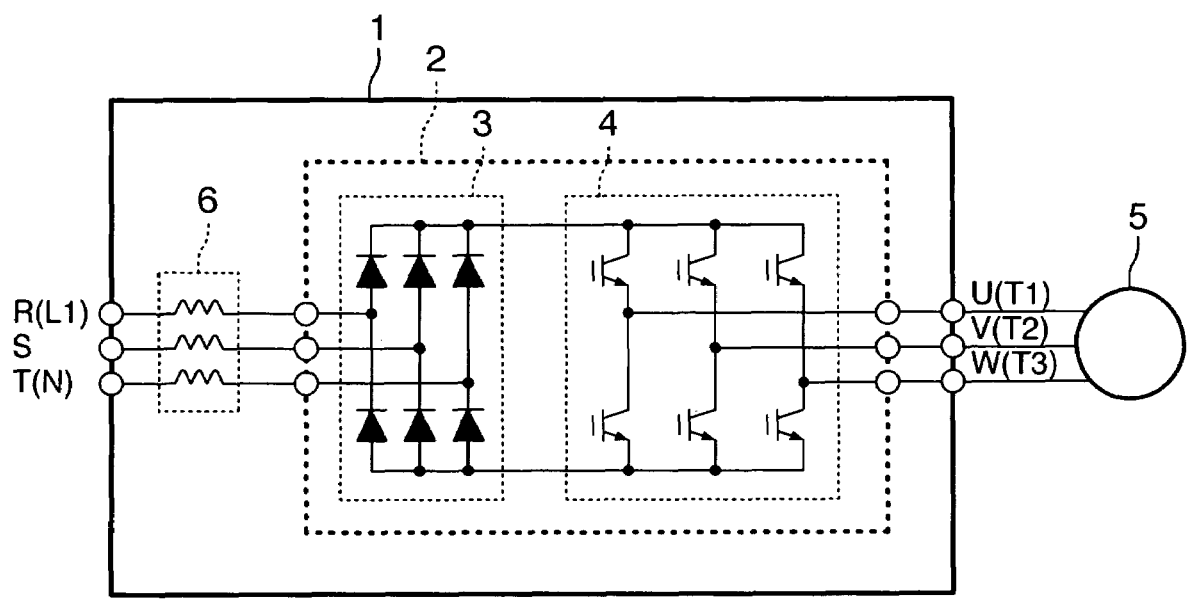
FIG. 16 is a diagram for explaining the case in which a coil is arranged between the power input unit and the rectifier portion.

FIG. 16 shows a circuit example in which the coil 6 is arranged between the power input unit and the rectifier portion 3 as a circuit element.

According to the embodiments of the invention, as explained above, the effect of the noise filter can be improved by changing the structure of the power module.

Also, the structures according to the embodiments described above makes it possible to maintain the filter effect even in the case where the coil is mounted in the power module as a circuit element. The term "across the coil" or "between the ends of the coil" is defined as "between the ends of the coil winding" regardless of the number of phases.

Also, the wording "in the power module as a circuit element" means that a given part, even if arranged physically outside the power module, is connected to the interior of the power module as a circuit element, and subject to the effect of the capacitance generated by the structure of the power module.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A power conversion apparatus comprising:
   a rectifier circuit for converting the supplied AC power to the DC power;
   a smoothing circuit for smoothing the output of the rectifier circuit;
   an inverter circuit for outputting by converting the output of the smoothing circuit into AC power;
   a control circuit for controlling the inverter circuit according to a pulse width modulation scheme;
   a first substrate on which the rectifier circuit is mounted;
   a second substrate on which the inverter circuit is mounted;
   a support unit for supporting the first substrate and the second substrate integrally; and
   an EMi filter including a coil inserted between the rectifier circuit and the inverter circuit;
   wherein the first substrate and the second substrate are electrically isolated from each other.

2. A power conversion apparatus according to claim 1, wherein the first substrate and the second substrate integrated with each other include an insulating layer formed on the surface of a conductor, and
   wherein the conductor includes a portion electrically isolated from another portion of the conductor.

3. A power conversion apparatus according to claim 1, wherein the first substrate and the second substrate integrated with each other include an insulating layer formed on the surface of a conductor, and
   wherein the insulating layer includes a portion for electrically isolated from another portion of the insulating layer.

4. A power conversion apparatus according to claim 1, wherein an insulating plastic material is arranged in a portion for electrically isolating at least the first substrate and the second substrate from each other.

5. A power conversion apparatus according to claim 4, wherein the insulating plastic material is about the same height as a height of at least one of an insulating layer of the first substrate and an insulating layer of the second substrate.

6. A power conversion apparatus according to claim 1, wherein an EMi filter including a coil is arranged on a surface of at least both the first substrate and the second substrate.

7. A power conversion apparatus according to claim 2, wherein the conductor comprises aluminum.

8. A power conversion apparatus comprising:
   a rectifier portion for converting the supplied AC power to the DC power;
   a smoothing portion for smoothing the output of the rectifier portion;
   an inverter portion for outputting by converting the output of the smoothing portion into AC power; and a control portion for controlling the inverter portion according to a pulse width modulation scheme;

wherein a first substrate including the rectifier portion and a second substrate including the inverter portion are formed integrally with each other and are electrically isolated from each other, and wherein an EMi filter including a coil is arranged between the rectifier portion and the inverter portion.

9. A power conversion apparatus according to claim 8, wherein the first substrate and the second substrate integrated with each other include an insulating layer formed on the surface of a conductor, and wherein the conductor includes a portion electrically isolated from another portion of the conductor.

10. A power conversion apparatus according to claim 8, wherein the first substrate and the second substrate integrated with each other include an insulating layer formed on the surface of a conductor, and wherein the insulating layer includes a portion which is electrically isolated from another portion of the insulating layer.

11. A power conversion apparatus according to claim 8, wherein an insulating plastic material is arranged in a portion for electrically isolating the first substrate and the second substrate from each other.

12. A power conversion apparatus according to claim 11, wherein the insulating plastic material is about the same height as a height of at least one of an insulating layer of the first substrate and an insulating layer of the second substrate.

13. A power conversion apparatus according to claim 8, wherein an EMi filter including a coil is arranged on the surface of the first substrate and the second substrate.

14. A power conversion apparatus according to claim 9, wherein the conductor comprises aluminum.

15. A power conversion apparatus according to claim 8, wherein a separation electrically isolates the first substrate and the second substrate from each other; and wherein at least part of the coil is positioned above the separation.

16. A power conversion apparatus comprising:

a rectifier circuit for converting the supplied AC power to the DC power;

a smoothing circuit for smoothing the output of the rectifier circuit;

an inverter circuit for outputting by converting the output of the smoothing circuit into AC power;

a control circuit for controlling the inverter circuit according to a pulse width modulation scheme;

a first substrate on which the rectifier circuit is mounted;

a second substrate on which the inverter circuit is mounted;

a support unit for supporting the first substrate and the second substrate integrally; and an EMi filter including a coil inserted between the rectifier circuit and the inverter circuit;

wherein a separation electrically isolates the first substrate and the second substrate from each other; and wherein at least part of the coil is positioned above the separation.

17. A power conversion apparatus according to claim 16, wherein an insulating plastic material is arranged in a separation that electrically isolates the first substrate and the second substrate from each other.

18. A power conversion apparatus according to claim 17, wherein the insulating plastic material is about the same height as a height of at least one of an insulating layer of the first substrate and the second substrate.

19. A power conversion apparatus comprising:

a power input/output unit for receiving AC power;

a rectifier circuit for converting the supplied AC power to the DC power;

a smoothing circuit for smoothing the output of the rectifier circuit;

an inverter circuit for outputting by converting the output of the smoothing circuit into AC power;

an additional power input/output unit for transmitting power generated by the inverter circuit;

a control circuit for controlling the inverter circuit according to a pulse width modulation scheme;

a first substrate on which at least one of a power input/output unit and the rectifier circuit is mounted;

a second substrate on which at least one of the inverter circuit and a power input/output unit is mounted;

a support unit for supporting the first substrate and the second substrate integrally; and an EMi filter, including a coil, connecting the first substrate to the second substrate;

wherein a separation electrically isolates the first substrate and the second substrate from each other; and wherein at least part of the coil is positioned above the separation.

* * * * *

UNITED STATES PATENT AND TRADEMARK OFFICE
CERTIFICATE OF CORRECTION

PATENT NO. : 7,567,446 B2
APPLICATION NO. : 11/637092
DATED : July 28, 2009
INVENTOR(S) : Sugino et al.

It is certified that error appears in the above-identified patent and that said Letters Patent is hereby corrected as shown below:

*Item (73) Assignee:*

Delete: "Hitachi Industrial Equipment System Co., Ltd.,"

Insert: --Hitachi Industrial Equipment Systems Co., Ltd.,--

Signed and Sealed this

Fifteenth Day of December, 2009

David J. Kappos
*Director of the United States Patent and Trademark Office*